GENERATION OF LINE FEED SIGNALS IN TAPE PUNCH EQUIPMENT

Filed April 30, 1956 9 Sheets-Sheet 1

INVENTOR.
HENRY L. THOLSTRUP
BY [signature]
ATTORNEY

Nov. 11, 1958 H. L. THOLSTRUP 2,859,817

GENERATION OF LINE FEED SIGNALS IN TAPE PUNCH EQUIPMENT

Filed April 30, 1956 9 Sheets-Sheet 2

*INVENTOR.*

HENRY L. THOLSTRUP

*BY* [signature]

ATTORNEY

GENERATION OF LINE FEED SIGNALS IN TAPE PUNCH EQUIPMENT

Filed April 30, 1956 9 Sheets-Sheet 3

*INVENTOR.*
HENRY L. THOLSTRUP
*BY* [signature]
ATTORNEY

*INVENTOR.*
HENRY L. THOLSTRUP
BY
ATTORNEY

GENERATION OF LINE FEED SIGNALS IN TAPE PUNCH EQUIPMENT

Filed April 30, 1956 9 Sheets-Sheet 5

GENERATION OF LINE FEED SIGNALS IN TAPE PUNCH EQUIPMENT

Filed April 30, 1956

9 Sheets-Sheet 6

Nov. 11, 1958 H. L. THOLSTRUP 2,859,817

GENERATION OF LINE FEED SIGNALS IN TAPE PUNCH EQUIPMENT

Filed April 30, 1956 9 Sheets-Sheet 8

INVENTOR.
HENRY L. THOLSTRUP

BY [signature]

ATTORNEY

INVENTOR.
HENRY L. THOLSTRUP
BY
ATTORNEY

United States Patent Office 2,859,817

Patented Nov. 11, 1958

2,859,817

GENERATION OF LINE FEED SIGNALS IN TAPE PUNCH EQUIPMENT

Henry L. Tholstrup, Rochester, N. Y., assignor to Commercial Controls Corporation, Rochester, N. Y., a corporation of Delaware

Application April 30, 1956, Serial No. 581,590

10 Claims. (Cl. 164—113)

This invention relates to apparatus for processing data represented in coded form, and more particularly to a system including a punched tape reader, a printer and a tape punch in which a record may be generated, duplicated, regenerated in modified form, or read and transcribed either as a direct representation of the data read from a record tape, or in modified form, according to a unique system of code interpretation.

More specifically, the invention relates to the manipulation of carriage return and line feed signals in a system of the kind described.

The data printers utilized in systems to which the present invention pertains, are of two kinds insofar as the line feeding or platen indexing operation is concerned. One class of printers available today have line spacing mechanism which operates as a result of the carriage return movement. A second class of printers achieves line spacing independent of carriage return movement. It follows, therefore, that for the remote control of printers of the two classes referred to, a carriage return signal received in the first mentioned type of printer will result not only in the return of the carriage to a starting position, but also in a line spacing movement of the paper platen. For the line spacing of the platen in the second type of printer, a separate line spacing signal is required since the line spacing operation does not follow as a result of the carriage return movement.

It is, therefore, a specific object of the present invention to provide a system for the control of a tape punch, which will either ignore a line spacing signal that is received if the tape being punched is to be used in apparatus that embodies a printer in which line spacing results from carriage return movement, and one in which a line spacing signal is generated whenever necessary if the tape being punched is to be used for the control of a printer requiring a separate and distinct line feed signal.

Other objects of the invention will be pointed out in the following description and claims and are illustrated in the accompanying drawings which disclose, by way of example, the principles of the invention in the best mode which has been contemplated for applying those principles.

Figures 3, 4:
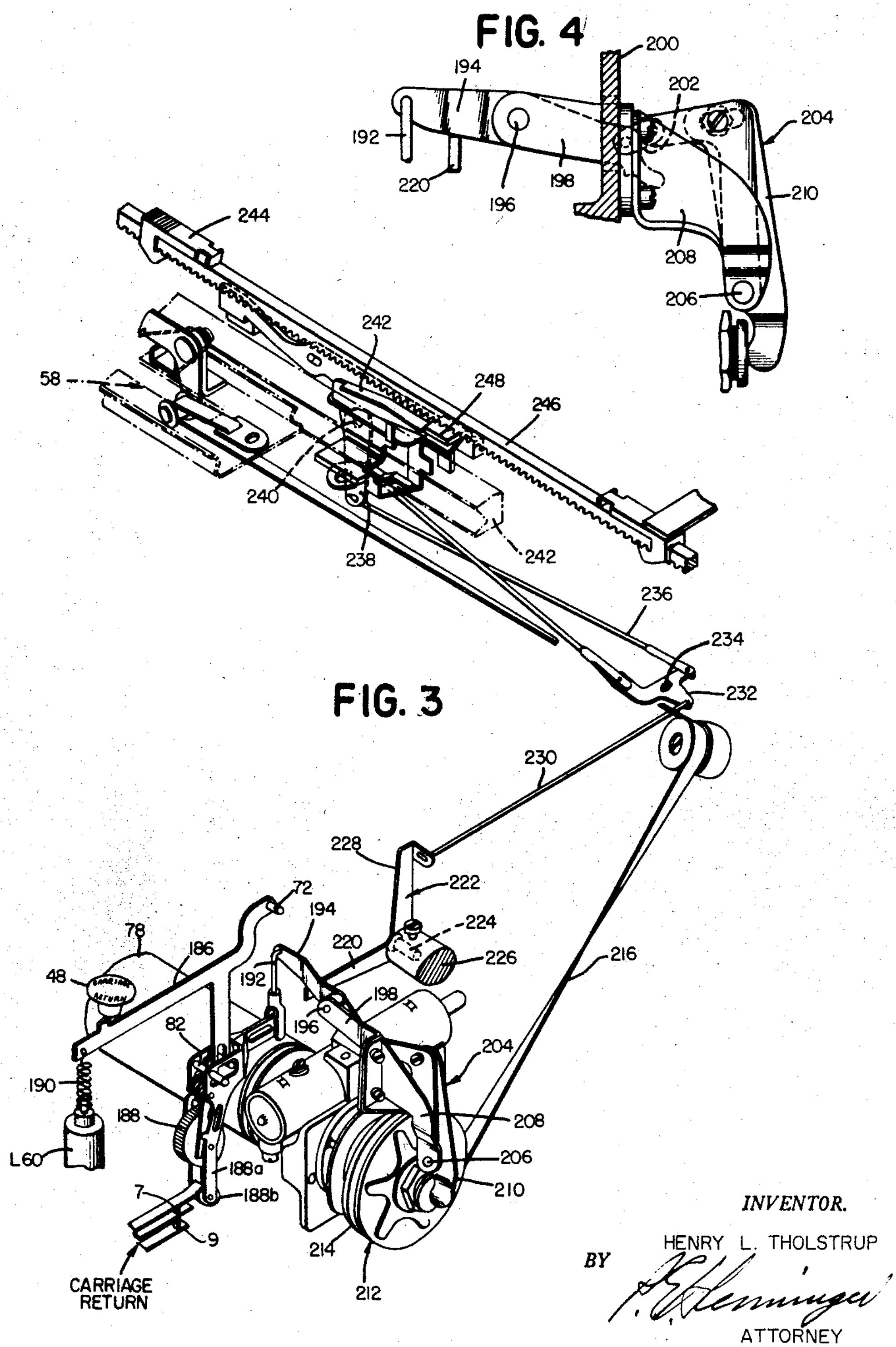
Figures 5, 6:
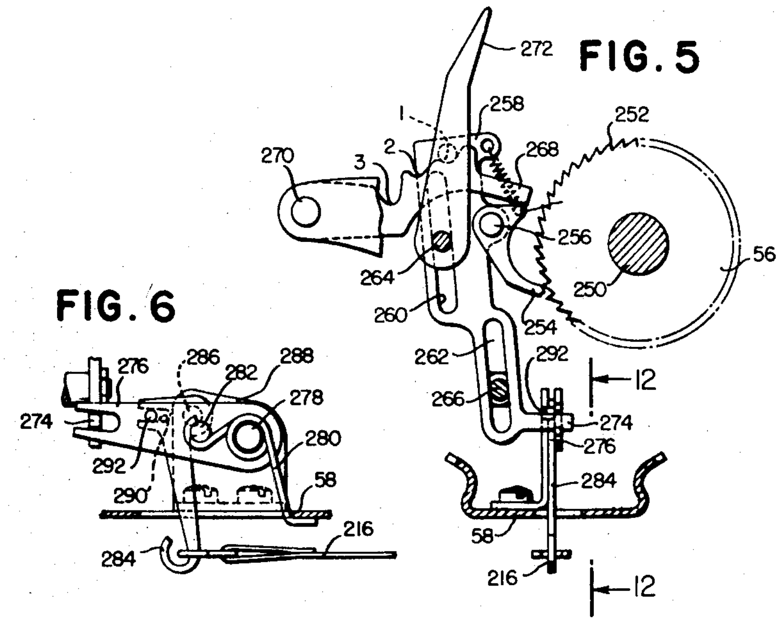
Figure 7:
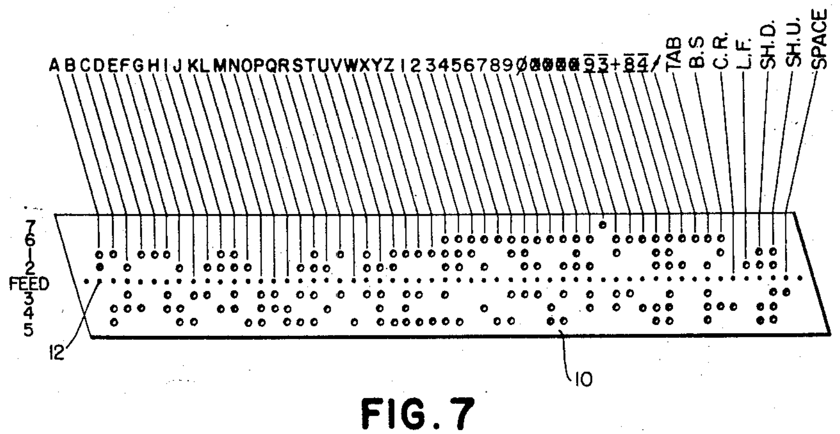
Figure 8:
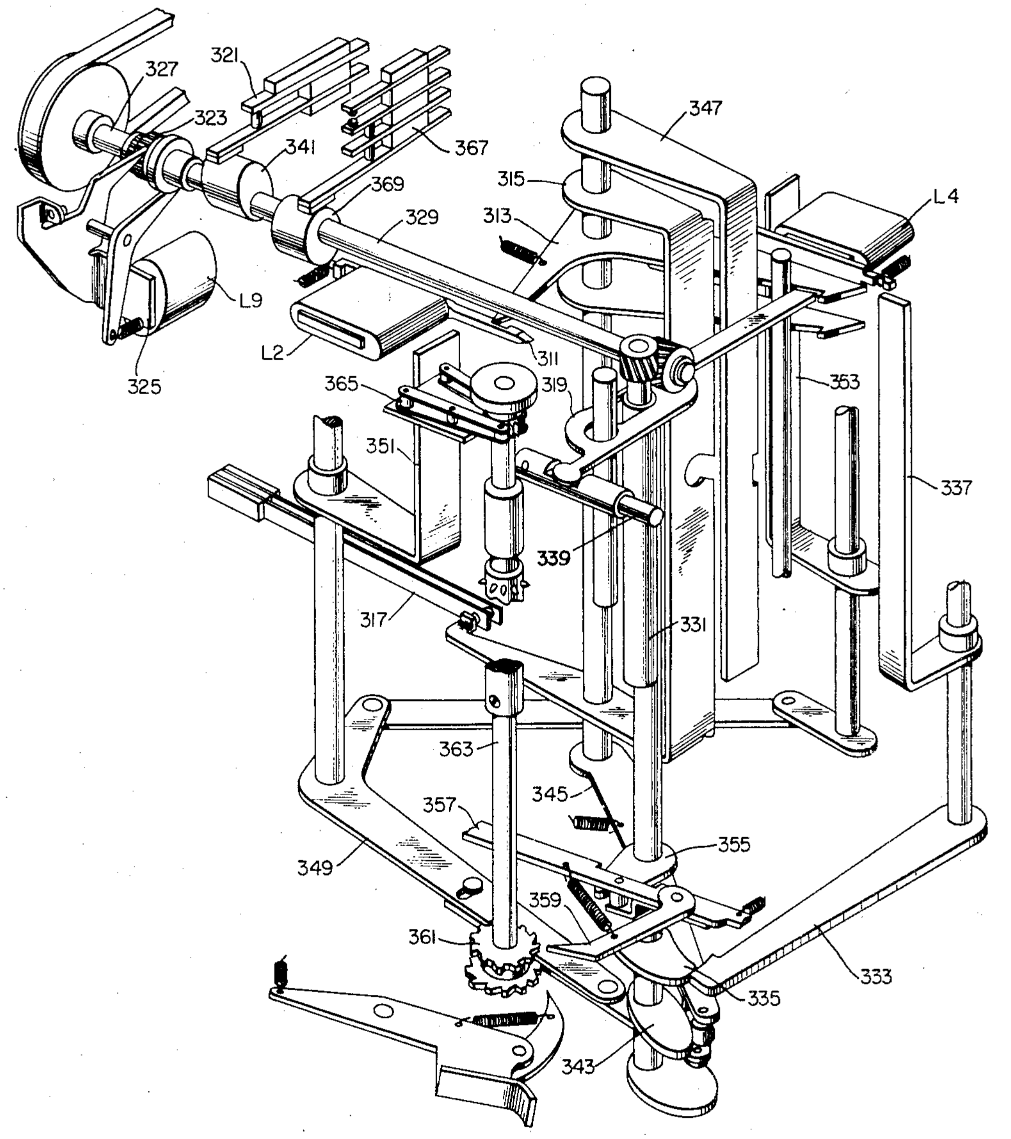

Fig. 3 comprises the carriage return mechanism of the typewriter;

Fig. 4 is a detail showing the carriage return clutch control linkage system;

Figs. 5 and 6 are detailed views of the spacing mechanism;

Fig. 7 is a section of paper tape having therein the perforated code combinations utilized for control of the system;

Fig. 8 illustrates the essentials of the tape punch; and

Figs. 9*a* through 9*f* constitute, in diagrammatic form, the electrical control system.

Before considering in detail the construction and operation of the illustrated embodiment of the invention, it may be helpful to consider first one practical example of a preselected combinational code by means of which the intelligence, such, for example, as a letter or a functional operation, which it is desired to transcribe or perform can be recorded on a record strip or tape. Fig. 7 of the drawings shows a portion of a record tape 10 into which has been punched all of the code hole designations of a combination seven hole code. The seven code positions are indicated at the left end of the tape section 10 by reference numerals 1 through 7, and the code holes for each bit of information are arranged in a vertical column or recording or data field. At the upper edge of the tape is placed the particular character or typewriter function corresponding to the code designation in that field. The small holes 12 at the center of the tape 10 and within each of the several recording fields are for the purpose of feeding the tape lengthwise during the reading or sensing operation. The tape may be punched by any suitable means such, for example, as by the typewriter controlled punch disclosed in my prior Patent No. 2,436,126, issued February 17, 1948.

In the tape section of Fig. 7 certain of the functional code designations should be particularly noted since this invention concerns itself chiefly with the typewriter functions produced upon the reading of certain of the functional codes. Thus, it may be seen by reference to Fig. 7 that the carriage return function is represented by a 4 hole in the tape, whereas the line feed operation is indicated by a 2 hole. In similar manner, it may be noted that the code ordinarily resulting in the shifting of the type basket to upper case position is indicated by the 1—2—4 and 5 holes in a given field, whereas the shift release which results in the shifting of the type basket to the lower case position is indicated by the 1—2—3—4 and 5 holes of the field. The space function is called for when a 3 hole is sensed.

Figure 1:
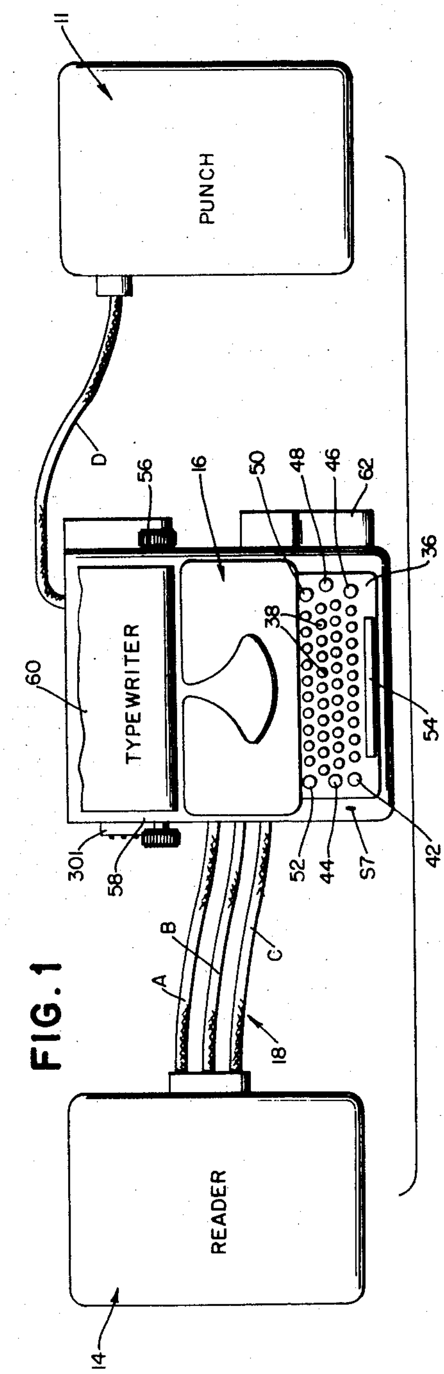
Figure 1 is a plan view of a tape reader, a typewriter, and a tape punch comprising the system to which the invention has been applied.

In Fig. 1 of the drawings, the reference numeral 14 represents a reading unit adapted to feed a record tape and read therein the code holes appearing in successive data fields. The reading unit may be of the general character disclosed in my Patent No. 2,378,371, and since its specific mechanism forms no part of the present invention, only brief reference need be made thereto. In Fig. 1 it will be seen that the tape reading unit 14 is connected to a typewriter 16 by means of an electrical cable 18, which contains the necessary individual circuit wires (not shown) for effecting operation of the apparatus. The cable 18 is composed of cable sections A, B and C.

The typewriter 16 which is shown in plan in Fig. 1 and certain detailed construction thereof in Figs. 4 through 6, is a well known commercial form of power driven typewriter having such modifications and additions as required to adapt it to this invention. Insofar as the conventional features of the typewriter are concerned, they will be described only generally, since they are well known in the art. The additions and modifications will be described more specifically to render the description of the present invention intelligible.

In Fig. 1 the typewriter 16 is shown as comprising the usual keyboard 36, comprising the character keys 38 which operate corresponding type bars, and the functional keys which include the shift key 42 (upper case), the shift lock key 44 (upper case and lock), the shift release key 46 (lower case), the carriage return key 48, the back space key 50 and the tabulating key 52. The space bar is indicated by the reference numeral 54. The typewriter 16 also comprises the conventional, rotatable platen 56 mounted on the typewriter carriage 58, the platen 56 being adapted to support a copy sheet 60 on which the data recorded in the tape 10, or a modified interpretation thereof, is automatically typed. At the lower left hand side of the typewriter 10 as viewed in Fig. 1 is a power switch S7 which, when closed, connects a source of alternating current with the typewriter motor. At the lower right side of the typewriter, as viewed in Fig. 1, is mounted a switch panel 62, shown in detail in Fig. 2, directly below the typewriter of Fig. 1, which includes a switch S11 for turning on the punch and a pair of three-positioned switches S8 and S9. The switch S8 is a step-run switch for the tape reader and the switch S9 is a step-run switch for the tape punch. The switch S12 is an insert switch which when thrown into one position will permit the typewriter to operate under manual control while the tape reader is at rest, and when in its other position it serves to condition the circuits for synchronous reading in the tape reader and transcribing in the typewriter. The switch S8 is for controlling the tape reader 14, this being a three-position switch which when in its first position serves to stop tape reader action, and which when in its second position conditions the tape reader for sequential reading of record fields in the tape, but when in its third position results in the reading of a single code field followed by an interruption of the reading action.

The tape punch 11 of Fig. 1 is shown connected to the typewriter by a cable D. The punch 11 has a control panel, shown directly below in Fig. 2, on which are located the switches S13, S14, S15 and S16. Within the tape punch is a spindle (not shown) for holding a supply of paper tape which is fed past a punch block at which point a plurality of punches are adapted to punch holes into transverse data fields in coded form.

Figure 2:
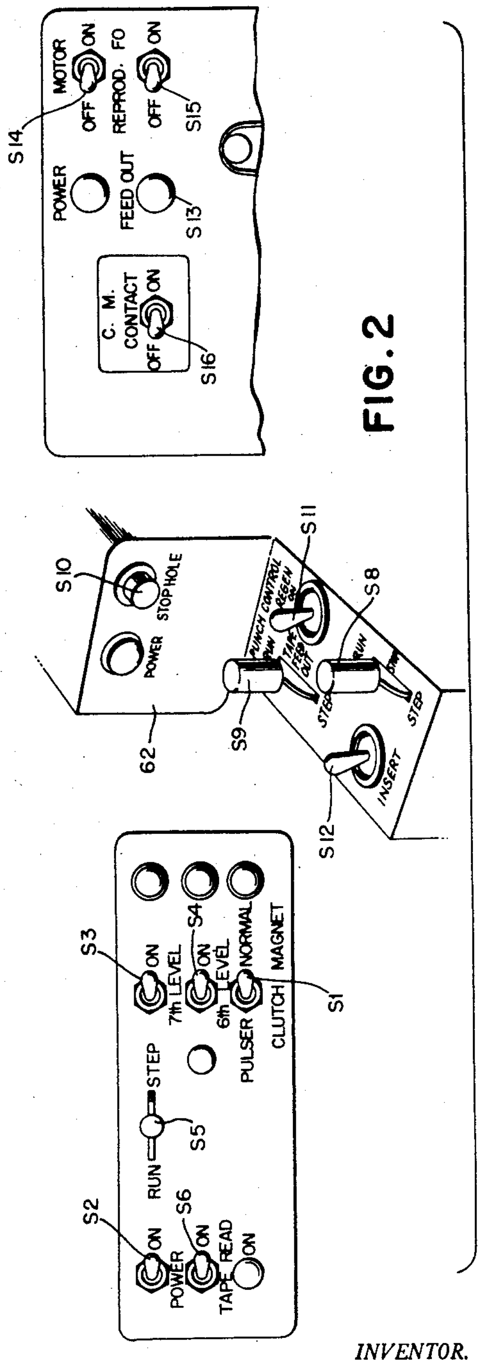
Fig. 2 shows, from left to right, the details of the tape reader control panel, the typewriter control panel, and the tape punch control panel.

In Fig. 2, and located directly below the tape reader of Fig. 1 is illustrated the control panel on the face of the tape reader. This control panel includes the switches S1, S2, S3, S4, S5 and S6.

When the tape reader, the typewriter and the tape punch are electrically connected with each other, as shown in Fig. 1, signals generated in the tape reader by reason of a record tape being read therein will control certain functions in the typewriter, and the typewriter will recode the data and transmit the same by way of cable D to the tape punch 11 for regenerating a record tape in the punch. Manual manipulation of the typewriter will also result in the transmittal of signals from the typewriter through the cable D to the tape punch for the control of the same. The tape reader 14 may be directly connected to the tape punch 11 through cables B and D, whereby a tape being read in the tape reader will be reproduced in the tape punch.

The tape reader is of the general type shown in my Patent No. 2,378,371. The tape reader has as its primary function the translation of characters, represented by a combination of code holes punched in a paper tape, to generate a single electrical signal for each combination of holes in the tape. The signals read from the tape are routed through a relay translating network such as that shown in my aforesaid patent wherein the combination of signals obtained upon the reading of a data field in the tape is translated into a single electrical impulse representative of the character or function called for by the code. From the relay translating network the respective signals may be transmitted to the operating solenoids of the electric typewriter or to selector magnets of the punch. When the coded tape is fed through the reader, feeler pins move up through code holes in the tape. A contact will close under each feeler pin having a code hole above it. The contacts of the feeler pins are electrically connected to their respective relays in the translating network. Therefore, each time a feeler pin moves through a code hole in a tape its corresponding relay in the translating network is energized.

The relays in the translator set up an A. C. path to a typewriter solenoid which corresponds to the code in the tape, and this solenoid pulls down its respective key lever, typing a character or operating a function as the case may be. When the reader is directly connected to the punch for the purpose of reproducing tape, the selector magnets in the punch are energized when a corresponding feeler pin contact in the reader closes. The punch will perforate a duplicate of the tape being read in the reader if directly connected, whereas the intelligence read from the tape in the reader may be altered in its passage through a control panel on the typewriter.

Essential details of the typewriter construction are shown in Figs. 3 to 6, inclusive, and as stated previously, comprise elements of a well known commercial power driven typewriter. The structural features and principles of operation of this typewriter are disclosed in a number of U. S. patents, among which is Patent No. 1,777,055, granted September 30, 1930, which discloses the general principles of operation of the key levers and how they control, through related cam units, the operation of the type bars. In view of the detailed description of the construction and operation of the parts given in the prior art, only a brief description will be given herein such that will be sufficient to enable the present invention to be understood.

This invention concerns itself with the carriage return and line spacing function as controlled by operational codes in the record tape. Therefore, a sufficient description of the mechanism for causing carriage return and line spacing will be shown and described herein to render intelligible the invention as applied thereto. Attention is directed to Patent No. 2,104,559, dated January 4, 1938 and Patent No. 1,753,450, dated April 8, 1930, for a full disclosure of the structural details of the carriage return mechanism shown herein, the latter granted patent being directed to the specific clutch shown herein for connecting the power roller to the drum about which the carriage return tape is wound.

Referring to Figs. 3 and 4, the carriage return key 48 is shown as mounted on a key lever 186 pivoted on the rod 72 and controlling the operation of a cam unit 188 which is conventional with the exception that it has an extension 188*a* adapted to support a contact operating cam roller 188*b* for operating a plurality of carriage return contacts, of which only CR contacts 7 and 9 are shown. A solenoid L60 is connected by a spring 190 to the key lever 186 and when energized moves the key lever downwardly to effect operation of the cam unit 188. The latter is connected by a link 192 with the inner or left end of a toggle lever 194 pivoted on a fixed stud 196 carried by a bracket 198 which is secured to a part 200 (see Fig. 4) of the frame of the typewriter. The outer or right end of the lever 194 is connected by a toggle link 202 (Fig. 4) to one arm of a two-part lever 204 pivoted on a pin 206 which is carried by the lower end of a bracket 208 fixed on the typewriter frame part 200. Another arm 210 of the two-part lever 204 is disposed adjacent a clutch 212. As described in Patent No. 2,104,559, when the lever 204 is rocked clockwise, as viewed in Fig. 4 herein, the clutch 212 (Fig. 3) connects the power roller 78 with a drum 214 about which one end of a carriage return tape 216 is wound. The other end of the tape 216 is connected to a part of the typewriter carriage 58 as more particularly shown in Figs. 5 and 6. The connection of the carriage return tape 216 is to the mechanism which controls the indexing of the platen 56 and the consequent line spacing of the copy sheet 60. This latter mechanism will be described in some greater detail at a point hereinafter.

When the cam unit 188 is operated by energizing the solenoid L60, as just stated, or by manual depression of the key 48, the lever 194 is rocked counterclockwise as viewed in Fig. 4, and the toggle formed by the right arm of the lever 194 and the link 192 is straightened and thereby effects the just mentioned clockwise movement of the two-part lever 204 to engage the clutch 212. The lever 194 is moved by the link 192 slightly past the dead center position of the toggle, and thus the lever 194 and the associated parts are held in their clutch engaging position. Upon engagement of the clutch 212, the carriage 58 will be returned, i. e., moved to the right as viewed in Fig. 3, to begin a new line of typing.

At the same time that the lever 194 is moved to engage the clutch in the manner just described, the inner or left end of the lever 194 engages and moves downwardly one arm 220 of a bell-crank 222 which is suitably pivoted by a pin 224 to a fixed part 226 of the typewriter frame. The bell-crank 222 will thus be moved about its pivot pin and a second arm 228 thereof, through a connecting link 230, will move a lever 232 pivotally mounted on a pin 234 clockwise about its pivot; and the lever 232 through a link 236 will move a lever 238 clockwise about its pivot. The lever 238 is pivoted on a pin 240 which is mounted on the rail 242. The lever 238 is formed with an arm 242 which when moved counterclockwise in the manner just stated will be positioned within the path of travel of the left hand marginal stop 244 of the typewriter. The stop 244 is mounted on margin rack 246 carried by the typewriter carriage and can be positioned thereon at any selected point corresponding to a letter space position of the carriage. Near the end of the return movement of the carriage and just before the marginal stop engages a fixed lug 248 formed on the tab lever, to stop the carriage, the marginal stop 244 engages the top surface of the arm 242 and thereby rocks the lever 238 clockwise. When the lever 238 is thus moved clockwise, motion is transmitted through the link 236, the lever 232, and the link 230 to rock the bell-crank 222 as to move its arm 220 upward to engage the lever 194 and thereby move the latter clockwise to break the toggle and move the two-part lever 204 counterclockwise, which will effect disengagement of the drive disc of the clutch 212 and thereby release the tape drum 214 from driving engagement.

Details of the platen indexing mechanism which accomplish line spacing of the copy paper are shwn in Figs. 5 and 6. The platen 56 is rotatably mounted on its axis 250 to which is attached at one end thereof a ratchet wheel 252 which is adapted to be engaged by a feed pawl 254 for rotating the platen. The feed pawl 254 is pivoted on a pin 256, the pin 256 being carried by a sliding supporting member 258. The supporting member 258 has a pair of spaced slots 260 and 262 which embrace fixed guide studs 264 and 266. A finger 268 is pivoted on the carriage frame at 270 and has its free end resting on the top edge of the feed pawl 254. The upper edge of the finger 268 has a series of notches 1, 2 and 3 representing line spaces, and when the operating lever 272, which is mounted on the pivot pin 264 is moved into one of the line space notches 1, 2 or 3, the free end of the finger 268 bears on the top of the feed pawl 254 and alters the relation of the feed pawl 254 in respect to the ratchet wheel 252 by moving the supporting member 258 upward or downward so as to cause the feed pawl 254 to engage either every tooth, every second tooth or every third tooth of the ratchet wheel 252 in accordance with the setting of the hand lever 272.

The lower edge of the support 258 has a laterally extending lug 274 which engages in the slotted free end of the operating lever 276. The operating lever 276 is pivoted on a fixed pivot stud 278 and is normally held in its raised position by means of a spring 280 (Fig. 6) which is wound about the pivot stud 278 and has one end thereof anchored to the carriage 58 and the other end to a stud 282 extending from one face of the operating lever 276.

The platen indexing mechanism thus far described is operated through an indexing movement when the carriage is returned under the force of the carriage return tape 216. The end of the carriage return tape is attached to a downwardly projecting T-shaped lever 284 which is pivoted on a pivot stud 286. The studs 278 and 286 are carried by a fixed, upstanding bracket 288 secured to the carriage 58. One arm of the T-shaped lever 284 has a bifurcation 290 in which is received a pin 292 extending laterally from a face of the lever 276.

It will appear from the foregoing, therefore, that when the carriage is returned under the influence of the carriage return tape 216, the T-shaped lever 284 will be rocked in a counterclockwise direction about its fixed pivot 286 with the result that the bifurcated end 290 of the lever will move downwardly, and as a consequence of the connection between the bifurcation of the lever and the pin 292, the lever 276 will also be rocked downwardly, thereby drawing the supporting member 258 downwardly to the point where the slots 260 and 262 will engage their upper extremities with the pins 264 and 266, respectively. Thereupon, in accordance with the setting of the control lever 272, the platen will be indexed 1, 2 or 3 line positions as the carriage is being returned. It may be remarked at this point that the indexing of the carriage is a movement that takes place as the carriage is being returned, i. e., the return of the carriage and the indexing of the platen being in effect a joint and related operation.

Emphasis is placed on the line spacing mechanism herein for the reason that there are certain typewriters and copy machines such as those used, for example, in the teletype system of communication in which the carriage return operation and the platen indexing operation are completely separated from each other and dependent upon the receipt of distinct operational code signals for the initiation of their functions. The significance of this distinction can be realized when one considers the necessity for rendering compatible the present invention with the reading of record tapes in which distinct carriage return and line space indexing codes are present.

Figure 9A:
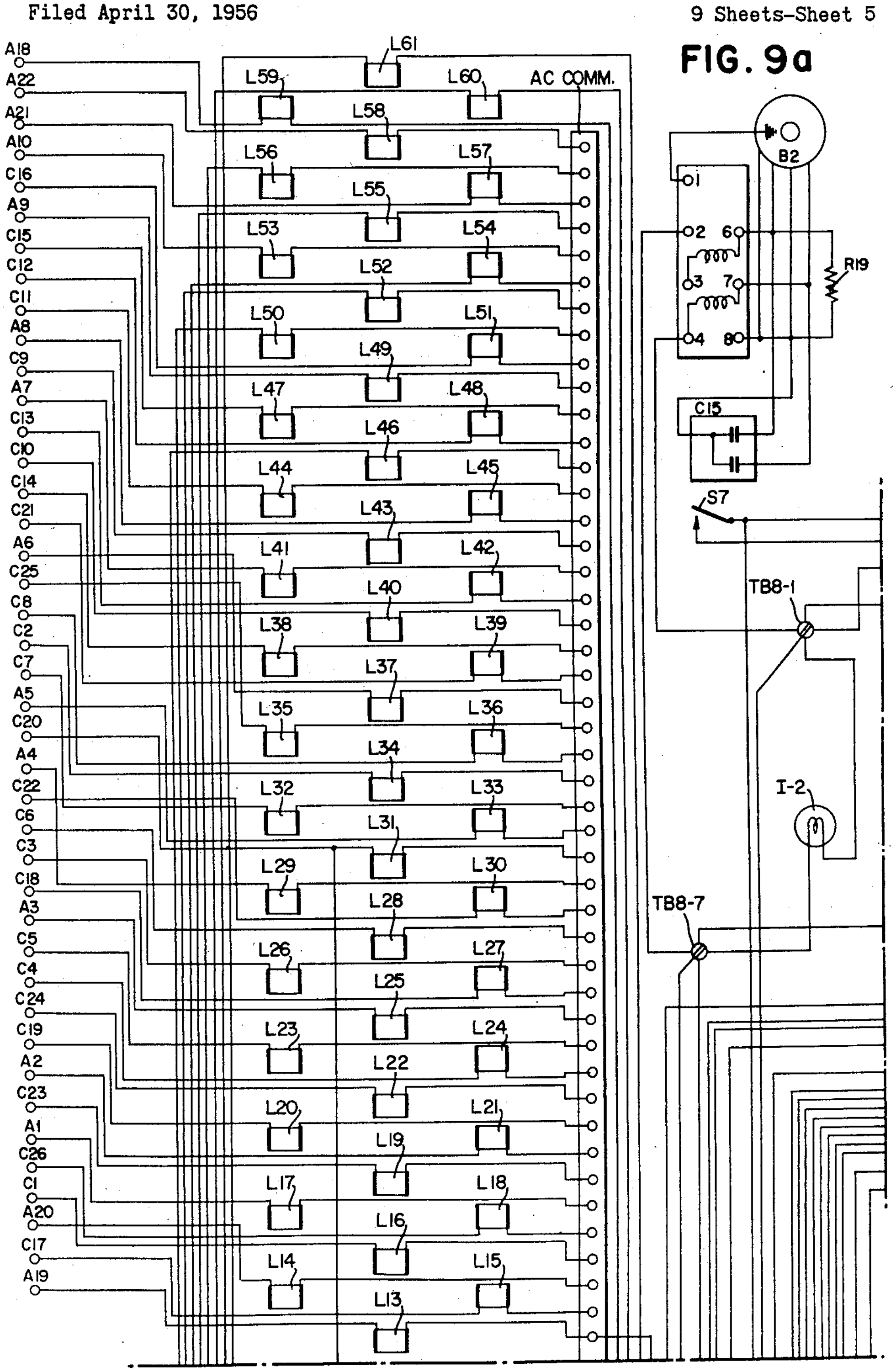
Figure 9B:
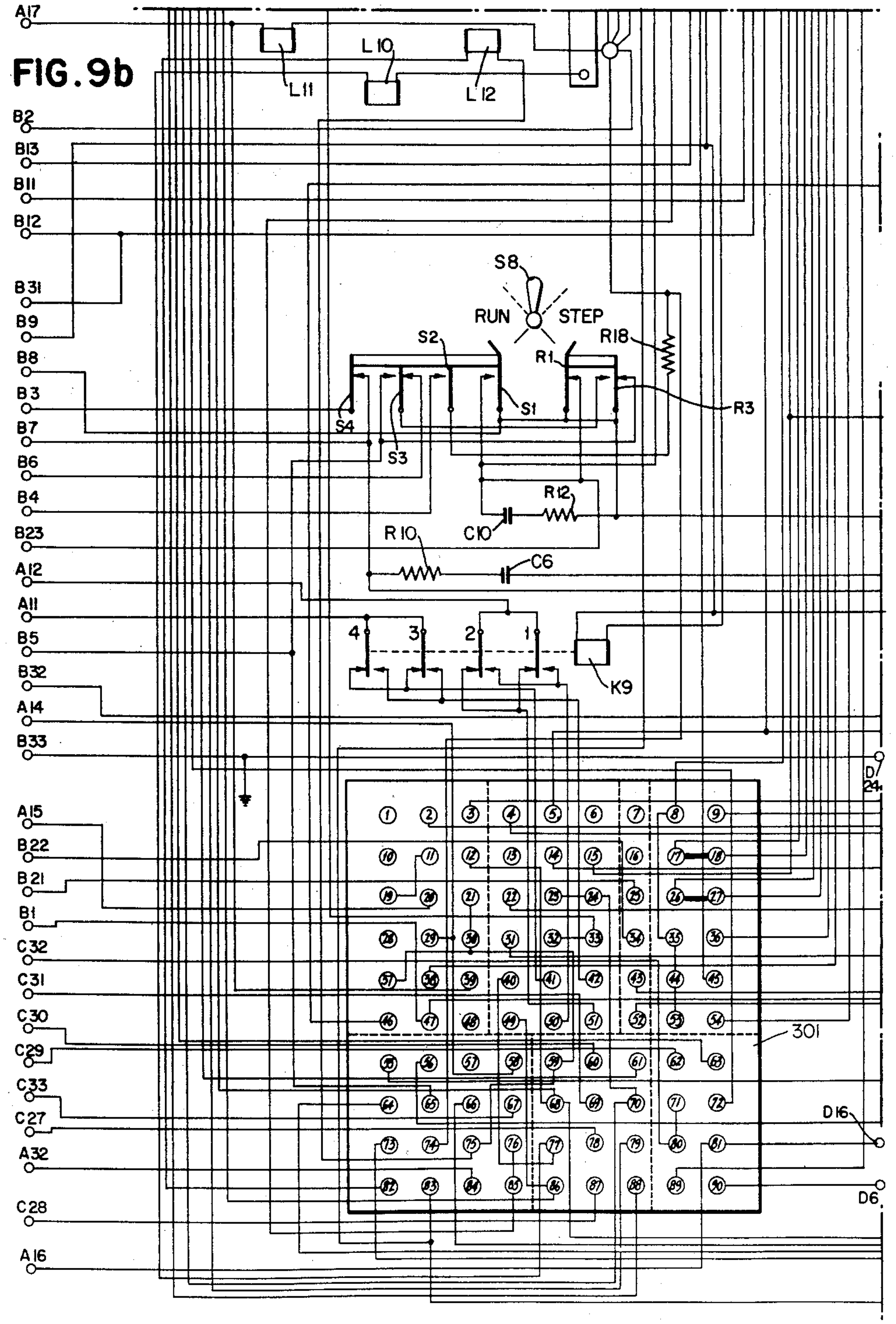
Figure 9C:
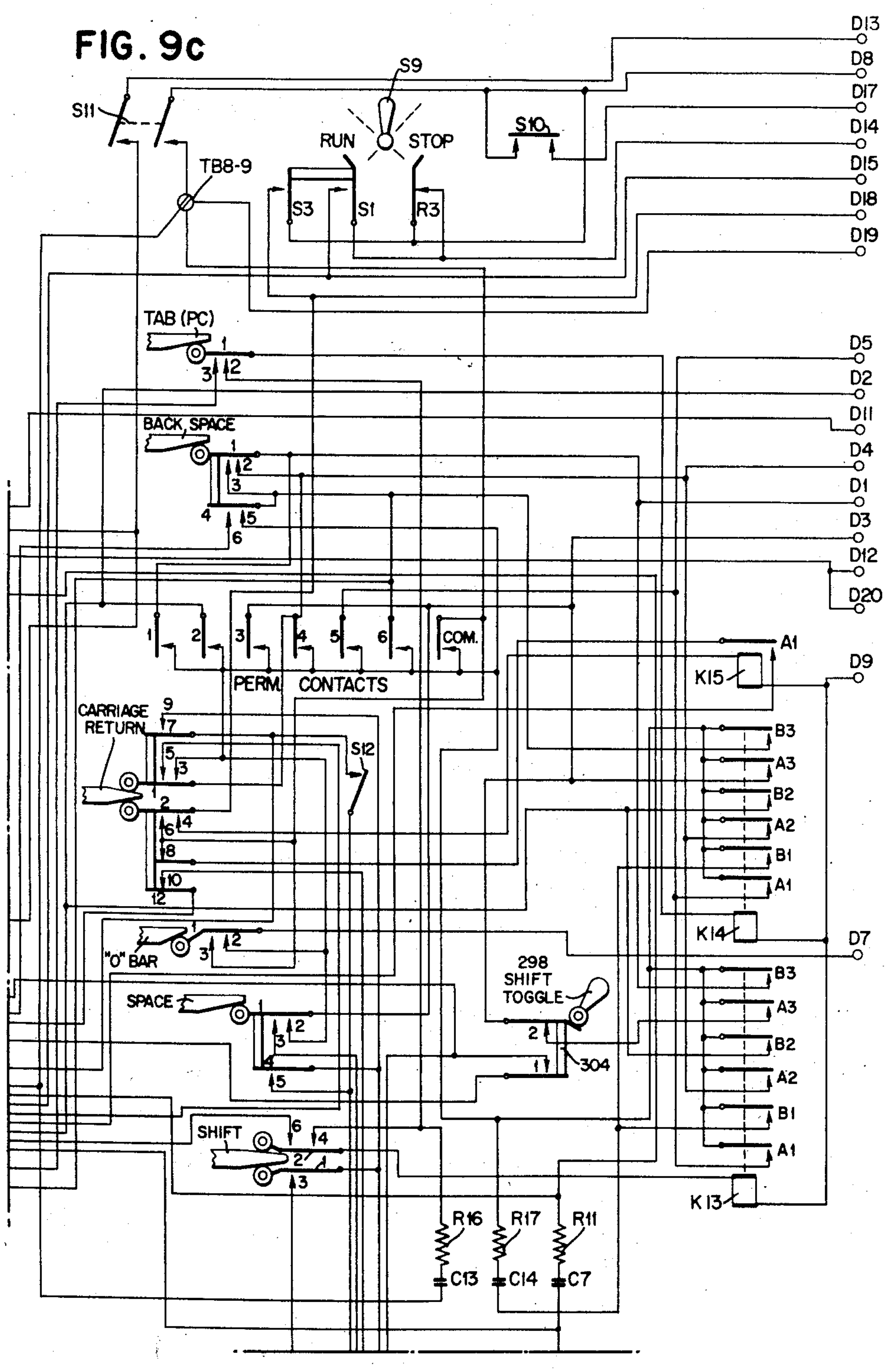
Figure 9D:
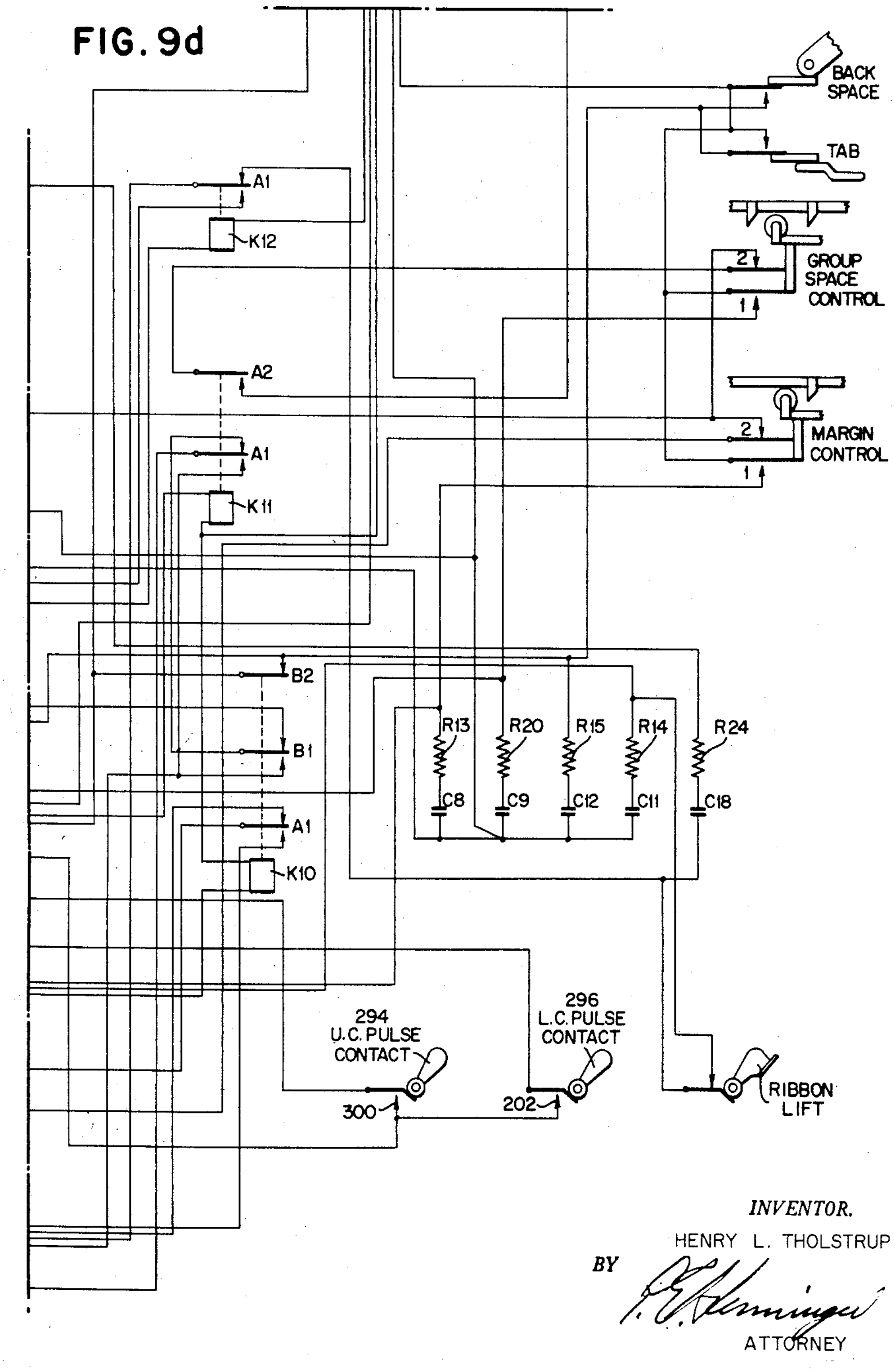
Figure 9E:
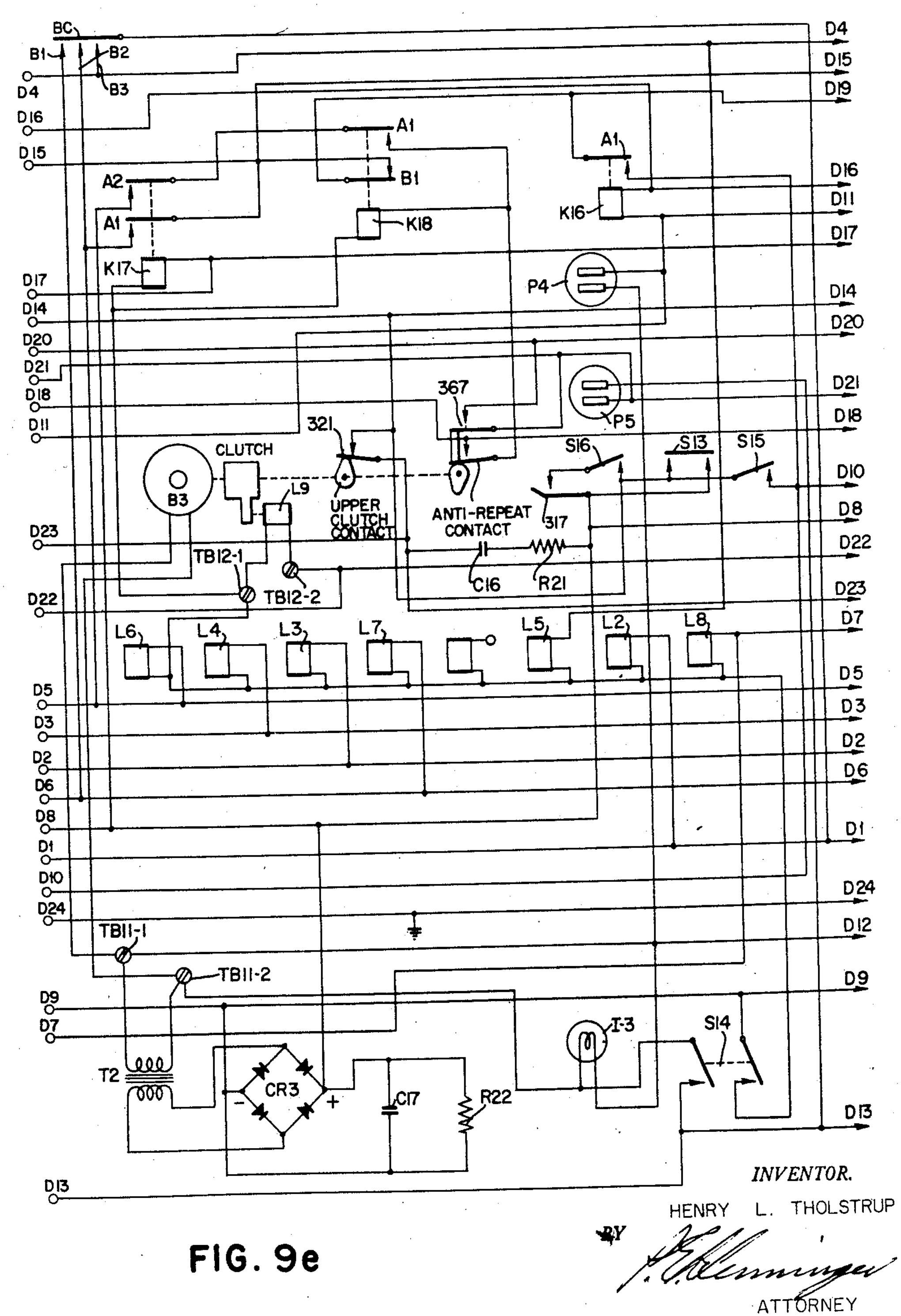

Figs. 9*a*–9*e* when taken together constitute the wiring diagram of the system. Figs. 9*a*–9*d* when taken together comprise the wiring diagram of the typewriter circuits, and Fig. 9*e* is the control circuit for the tape punch. At the left (Figs. 9*a* and 9*b*) are the conductor terminals which are connected to the tape reader by means of the three cables A, B and C. The conductors in cables A and C are those which are connected to the code translating network of the tape reader. In the wiring diagrams, corresponding reference numerals at pairs of cable terminals indicate that such pairs are electrically connected to each other. The conductors in cable B include the interlocking controls and power lines extending between the tape reader and the typewriter.

It will be noted that the conductors in cable A for the most part are connected to a bank of solenoids. This bank of solenoids contains not only those which, when operated, result in the actuation of a character type bar within the typewriter but also those necessary for the initiation of the usual typewriter functions. In this bank of solenoids is the solenoid L60 which controls the carriage return operation.

It will be noted by examining the circuit of Fig. 9*b* that many of the electrical conductors are connected into a control panel or plugboard 301 in the typewriter (see also Fig. 1). Plugboards are conventional in the business machine art where they are used as a switching device for selectively routing signals through a control system. Fig. 9*b* shows the permanent internal interconnection between certain hubs of the plugboard. The switching connections are established by means of jumper wires between certain of the hubs, the ends of which wires are removably plugged into the respective hubs from the exterior of the plugboard. Since the present invention concerns itself with the interpretation of certain incoming signals, the plugboard forms an important element of the control circuit.

When a perforated tape is read in the tape reader, signals representing the characters read from tape will appear on the respective lines of cables A and C. As stated, the tape reader will read a character in coded form, translate the code so read and impress a signal on the proper input lines of cables A or C, so that appropriate solenoids in the typewriter are energized to actuate either a character key or a functional device. For example, when a 2—4—6 code, representative of a 4, is read from a tape, a signal will appear at terminal A4 which is connected to the solenoid L29 (Fig. 18*a*). This is the solenoid which is connected to the key lever connected with the type bar having thereon the numeral 4. The numeral 4 will, therefore, be typed upon the copy sheet in the typewriter. Subsequent signals will be received on the various A and C cable terminals for the typing of further characters until a word has been completed, at which time a 3 code will be read, indicating that a word spacing operation is to follow. The space signal is received on the terminal A14 (Fig. 9*a*) which is connected to plug hub 29. This hub is externally connected by means of a plug wire to the hub 30, and since the hubs 82 and 83 are also externally connected by plug wire, a circuit is completed to the space solenoid L12 and a letter spacing operation will result.

The typing of a line will proceed until the line is complete, at which time a carriage return code 4 is read from the tape for energizing the circuits which will result in the return of the carriage and the indexing of the platen. This circuit is as follows. The pulse resulting from the reading of a 4 code will appear on terminal A15 (Fig. 9*b*) which is connected to the plug hub 20. Plug hub 20 is plug wired to the hub 19, which, by reference to Fig. 9*b*, is internally wired to the hub 11. The hub 11 is externally wired to the hub 12 which in turn is internally wired to the hub 68. The circuit may now be traced from the plug hub 68 to the carriage return solenoid L60 (Figs. 9*a* and 3) and from thence to the functional common terminal and the terminal B2 which is connected to the circuits of the tape reader, which will utilize voltage on line B2 to temporarily suspend reading of tape until the carriage return operation has been completed. At this time a signal will be received on line B1 (Fig. 9*b*) which is connected to plug hub 47. When the carriage return cam is operated, the carriage return contacts are transferred so that contacts 7 and 9 (Figs. 3 and 9*c*) are closed. When these contacts are closed, power will pass through the normally closed switch S12 (Fig. 9*c*), thereby energizing the function relay K12.

This results in the transfer of the A1 points of the relay K12 (Fig. 9*d*) to establish a circuit from the terminal B5 to the plug hub 65, which hub is externally plugged to the hub 64 and continuing through the now closed A1 point of the relay K12 and to terminal B7, where the voltage is used to restore the operation of the tape reader after it was delayed to permit the completion of the carriage return operation. When the tape reader continues to operate, power is again applied to terminal B1 which is connected to plug hub 47, bottle-plugged to hub 46 and to the now closed A1 terminal of the function relay K12, thus completing a circuit to the plug hub 64 which is plugged to the hub 65, which in turn is connected to the direct current source at terminal B5. The typewriter is now conditioned to write another line in accordance with the general sequence described above.

The punch which, as stated, is adapted for operation either by direct connection to the reader or by connection to the typewriter and may be generally of the type shown in A. W. Mills, et al. Patent No. 2,346,267, granted April 11, 1944. Only so much of the punch, therefore, need be illustrated and described herein as will render the application of the present invention intelligible. The punch is designed to perforate a paper tape with a predetermined set of code holes transversely of the tape within successive data fields. A tape of this type is adapted for translation in the reader shown herein or for transcription by the typewriter.

When a character is typed on the typewriter, an electrical signal is generated within the typewriter by the closure of various combinations of permutation contacts. The permutation unit may be of the type shown in Fig. 29 et seq. of E. O. Blodgett Patent No. 2,700,447, granted January 25, 1955. When a key lever is operated in the typewriter it will result in the closure of one or more of the permutation contacts shown in Fig. 9*c* and these contacts are connected through the D cable terminals to the selector magnets L2–L8 of the punch in Fig. 9*e*. These magnets, as previously stated, may also be directly connected through the B—D cable to the reader whereby a tape being read in the reader can be duplicated in the punch. The selector magnets of the punch when energized will release corresponding latch levers which engage one end of the punch actuating levers. The actuating levers are mounted on an eccentric shaft. The particular actuating levers selected by incoming signals are held at one end by the latch levers. Therefore, when the eccentric shaft starts to rotate, the opposite end of the actuating levers force the punch pins toward the tape. The punch pins will perforate the tape after a required degree of rotation of the eccentric shaft, whereafter the tape will be fed one position to prepare it for the next punching cycle.

Fig. 8 is a somewhat fragmentary perspective representation of the punch mechanism which is sufficient to explain its fundamental features. The electrical signal from the punch control permutation unit contacts of the typewriter or direct from the tape reader energize the corresponding coils of the selector mangets L2–L8 (see also Fig. 9*e*). When a selector magnet coil such as L2 (Fig. 8) is energized, the selector magnet armature 311 is attracted, thereby releasing the latch lever 313. The latch lever operates the lower clutch magnet contact bail 4 which operates the lower clutch contact 317. The latch lever also engages one end of the punch actuating lever 319.

The lower clutch contact 317 completes the circuit to the clutch magnet coil L9 through the upper clutch contacts 321 which are normally closed when the clutch 323 is latched. The clutch magnet coil L9 is energized, attracting the clutch magnet armature 325 which releases the clutch lever and allows the clutch dog to engage a ratchet tooth of the continuous running shaft 327. The ratchet shaft rotates the clutch shaft 329 and through two spiral gears rotates the vertical eccentric shaft 331. The eccentric portion of this shaft is engaged by the punch actuating levers. When properly timed, the high point of the eccentric portion is toward the drive pulley when the clutch is latched.

As the eccentric shaft starts to turn, the latch lock arm 333 drops into a recess in its cam 335, which is one of five cams in a cam group mounted on the eccentric shaft. When the latch lock arm 333 drops into the recess of its cam 335, it moves the latch lock bail 337 to such position that the bail locks the selected latch lever into engagement with the punch actuating levers, and the unselected latch levers out of engagement with the punch actuating levers. The actuating levers not selected are held back by a spring at the punch pin end, causing the opposite end (which is free) to swing out. The selected actuating levers are mechanically held by the latch levers 313, causing the punch pin end 319 of the levers to swing out, moving their respective code punch pins 339 toward the punch die block. As the eccentric shaft 331 continues to turn, the upper clutch magnet contact 321 is opened by the cam 341 on the clutch shaft, which deenergizes the clutch magnet coil L9.

The punch actuating lever 319 and code punch pins 339 that have been selected continue to move out through the first half of the cycle until the code punch pins have been driven through the tape and die block. In the next half cycle the punch pins start to return to their normal position; also, the latch lock bail 333 unlocks the selected latches 313. By action of cam 343, the latch reset cam arm 345 moves the latch reset bail 347 which in turn starts to move the latch levers 313 out of engagement with the actuating levers 319. When the latch levers 313 start to reset, the lower clutch magnet contact bail 315 moves as to open the lower clutch magnet contacts 317. As the latches are restoring, the armature knock-off cam arm 349 starts to operate the armature knock-off bails 351 and 353. After a certain degree of movement of the latch reset bail 347, the latch levers are moved approximately 1/32 of an inch beyond the notch on the armature. The armature knock-off bails 351 and 353 then move out and drive the armatures away from the selector magnet cores and against the tip of the latches, so that they are in locked position. While these armatures are moving away from the cores, the latches are stationary due to a dwell period on their reset cam.

The punch pins are now out of the perforated holes in the tape, and at this time the feed cam 355 starts to move the feed arm 357 which engages the feed pawl 359 by means of a stud mounted on the feed arm. The feed pawl engages a tooth in the feed ratchet 361 and starts to move the feed shaft 363 and the tape one position. The latch reset bail 347 again moves, allowing the latch levers to engage on the notch in the armatures. When the latches are engaged, the armature knock-off bails 351 and 353 start to return to their normal position.

The reset bail 347 continues to move away from the latches and the feed pawl continues feeding the tape. The knock-off bails come to rest, then the reset bail returns to its normal position and the feed pawl has moved the feed ratchet and tape one position. The detent rollers 365 settle into the teeth on the detent ratchet, thereby holding the feed ratchet in position. The upper clutch contacts 321 close and the feed arm 357 returns, carrying the feed pawl 359 back to normal position. The clutch magnet armature L9 engages the clutch lever 323, pulling the clutch dog away from the drive ratchet, thus latching the clutch and completing one cycle of the punch. It may be noted that the latch lever in the feed punch pin positon has no armature and is always engaged with the feed punch actuating lever. The feed punch pin and the feed punch actuating lever are driven out each time the eccentric shaft rotates, in order to punch feed holes along the center line of the tape. The anti-repeat contacts 367 are operated by the cam 369.

Fig. 9*e* is the control circuit for the punch and by reference to this figure, it may be seen that the alternating current source for the punch is a terminal plug P4 which may be connected to a suitable 115 volt, 60 cycle line. The terminal plug P4 is connected to the punch motor B3 and to the primary coil of the punch transformer T2. The step-down secondary voltage of the transformer is approximately 32 volts and this is supplied to the punch rectifier CR3. The power switch S14 mounted on the control panel of the punch breaks one side of the alternating current circuit in its off position and also breaks the negative side of the direct current circuit.

The direct current supply is furnished at the output of the punch rectifier CR3. This D. C. output voltage is approximately 75 volts at no load and approximately 60 volts at full load. A .25 microfarad condenser C16 is used across the D. C. output to smooth the D. C. voltage. A 25,000 ohm resistor R22 is placed across a .25 microfarad condenser C17 to bleed it after the power is turned off.

The clutch magnet circuit is the main electrical operating circuit in the punch. It controls the operation of the punch by energizing the clutch magnet coil L9. There are two sets of contacts connected in series on this coil. One is the lower clutch magnet contact (normally open) which is operated by the lower clutch magnet contact operating bail 315 (Fig. 8). The other is the upper clutch magnet contact 321 (normally closed) which is operated by a cam on the clutch shaft. One side of the lower clutch contact is connected to the positive side of the rectifier. When the lower contact 317 is closed by the operate bail, a circuit is completed from the positive side of the rectifier CR3 to the lower clutch contact 317, through the switch S13 to the upper clutch contact 321 and from thence to terminals D23 and D22 which may be connected to the typewriter where the circuit extends through the points TB12–2, the coil L9, the points TB12–1, switch S14 and through the terminal D9 to the minus side of the rectifier. The clutch magnet coil is thereby energized starting a cycle of punching operation.

The selector magnets L2–L8, as stated, when energized either singly or in combination operate a corresponding punch pin. When one or more permutation contacts in the typewriter is closed, the corresponding selector magnet is energized in the punch. For example, if the #9 key lever of the typewriter is operated, the permutation contact #1 and the common contact of the permutation unit will be closed, thereby closing the circuit to the punch selector magnet L2. It may be noted that the switch S11 of the typewriter must be in its home position to operate the selector magnet circuits.

The 115 volt, 60 cycle circuit of the tape reader is connected to the typewriter motor through the B cable. The A. C. circuit is controlled by either of the power switches S2 and S11, one located at the left side of the typewriter and the other located on the reader control panel. The D. C. circuit of the typewriter is powered from the rectifier in the reader.

In the operation of the typewriter there are certain functions which require more time to operate than that required for the typing of characters. In order to provide such additional time, it is necessary to stop the reader until the function within the typewriter is completed. The common return from the solenoid coils which control these functions requiring more time for their completion is connected in series with the buck coil on the delay control relay system of my above referred to tape reader patent. When one of the functional solenoids is energized, and as a result thereof the buck coil is energized, the delay control relay is bucked out, thus opening the clutch magnet circuit.

When the solenoids controlling the functions of tabulating, back spacing, shifting, or carriage return are energized, the key levers connected to these solenoids trip the cam controlling the respective operation. When this happens, a normally open contact related to the operation is mechanically closed, and in so closing, completes a circuit to the function relay K12 (Fig. 9*d*) in the typewriter. The function relay K12 becomes energized, closing its A1 transfer contact and opening the normally closed A1 contact. When the A1 transfer contact of the function control solenoid K12 is closed, a D. C. circuit is completed to the operate coil of the delay control relay of the tape reader, thus energizing this relay. When the normally closed A1 contact of the function control relay K12 opens, the D. C. circuit to the clutch magnet coil in the reader is broken. From the foregoing it can be seen that whenever a function is initiated in the typewriter by a solenoid which is connected to the functional common, the tape reader will stop. During the operation, a contact operated during the performance of that particular function will close in order to energize the function relay K12 (Fig. 9*d*); this, in turn, picks up the delay control relay in the reader, but the reader does not start because the clutch magnet circuit is broken by the opening of the normal A1 contact of the function relay K12. When the operation is complete, then the mechanically operated contact is allowed to open, thus breaking the circuit to the function relay K12, whereby the circuit to the clutch magnet coil of the reader is again completed to allow the reader to operate.

The invention concerns itself particularly with certain of the functions which are performed when a carriage return signal, a shift signal or a line space signal is received. As stated, in connection with an explanation of Figs. 3 through 6, the typewriter herein employed is of such mechanical structure that return movement of the carriage return tape 216 results in both the indexing of the platen and the return of the carriage to its left marginal position. As stated, certain communication equipment such as the teletype systems employ writers in which separate line spacing and carriage return functions are employed and for which separate signals are required. It is intended that the system herein described be operable under control of teletype tape, for example, and be adapted to produce a punched control tape which is operable in teletype equipment. Therefore, there has been provided herein a special control system for the performance of the carriage return and line spacing function.

To permit operation of the carriage return function and the perforation of a 4 code in the tape punch, the plugboard hub 19 (Fig. 9*b*) should be wired to the hub 20, the hub 11 should be wired to hub 12 and the hub 17 should be wired to hub 18. The routing of the carriage return signal may be altered to eliminate the carriage return signal completely, to eliminate the carriage return function or to operate the carriage return function but to eliminate the punching of the 4 code. To eliminate the carriage return signal completely, the plug wires which connect the plugboard hubs 11 and 12 are removed and the hubs 10 and 11 are wired to each other. To eliminate the carriage return function but to use the incoming 4 code signal to operate the space solenoid, it is necessary to remove the plugging between hubs 19 and 20 and to wire plug hub 20 to hub 21. To operate the carriage return function but to eliminate the regenerated 4 signal to the punch, it is necessary to remove the plug connection between plug hubs 14 and 18 and to wire plug hubs 16 to 17.

The regenerated functional signals which are ordinarily transmitted to the punch may be eliminated or altered. For example, to eliminate the carriage return code 4 from a regenerated tape, it is necessary to plug the plug hub 16 to 17, and to cause the punching of the carriage return code 4 it is necessary to plug the plug hub 17 to the hub 18. In similar fashion, in order to operate the line feed code circuit for punching a line feed code 2 in a tape, it is necessary to plug hub 26 to hub 27, but to eliminate the punching of the line feed code the wires connecting these hubs will be removed. If it is desired to perform a carriage return operation upon receipt of the CR (carriage return) character signal, this may be achieved by connecting plug hub 68 to hub 69. If the character CR is to be typed, a plug hub connection is made between hubs 69 and 70. In like manner, to type the character LF (line feed) as a result of the sensing of the 2—6 code, it is necessary to connect plug hub 62 to hub 63. The line feed signal can be entirely disregarded by removing the connection between the plug hubs 62 and 63. In this regard it will be remembered that the line feed signal performs no function in the typewriter herein, since the line feeding operation is a direct result of the carriage return function.

With the foregoing in mind the carriage return circuit and the line feed circuit to the punch can be conditioned to energize the selector magnets for punching a carriage return code 4 followed by a line feed code 2 in the punch, whether or not such signals are read from the record being sensed in the reader, and despite the fact that no separate line feed function is performed in the typewriter.

The selector magnet L5 in the punch when energized punches a 4 hole carriage return signal into the tape being regenerated. This is accomplished by the use of contacts operated by the carriage return selector bar on the permutation unit (Fig. 9*c*) which when operated will short together the carriage return contact straps 5, 3 and 1, thereby completing a circuit from the positive direct current typewriter switch S11 through plug terminal D19, to the closed B1 point of the relay K18 (Fig. 9*e*) in the tape punch, through the plug terminal D15 to plug hub 17, to bottle plugged hub 18, through point TB4–24, to the carriage return contact point 5, and through the now closed carriage return contacts 3 and 1 and from the carriage return contact 1, and from thence through cable terminal D4 to the selector magnet L5 and to the minus side of the D. C. circuit. The #4 selector magnet L5 is energized through this circuit, causing the punching operation to start. When the carriage return contacts were operated by the selector bar, the contact straps 2, 4 and 6 were also shorted together. Therefore, at approximately 180° rotation of the punch clutch shaft, an anti-repeat contact circuit is completed as follows: from the positive D. C. supply through the typewriter switch S11, to the carriage return contact point 6, from the carriage return contact point 6 to the now closed carriage return contact point 2, and via the plug terminal D18 to the anti-repeat cam contact 367 and to the coil of the relay K18, and from thence to the minus side of the D. C. line. The anti-repeat relay K18 is energized, and when so conditioned it transfers its A1 and B1 contacts. When the common and transfer A1 contact points close, a holding circuit is completed to the anti-repeat relay K18. When the common points B1 of the anti-repeat relay K18 open, the positive D. C. circuit is broken to the #4 selector magnet L5, thus preventing a repeated punching of the 4 code in the tape.

As previously stated, the purpose of the line feed circuit in the typewriter and punch is to punch a line feed code 2 into a tape immediately following every carriage return code 4. In order to accomplish this function, a set of normally open and normally closed contacts in the carriage return contact assembly (Fig. 9*c*; see also Fig. 3) are utilized. When the carriage return contact assembly is operated as previously described, the contact 6 is closed with the contact 4 and the previous contact between the contact 6 and the contact 8 is broken. When contacts 4 and 6 are closed, a circuit is completed from the positive D. C. line through the typewriter switch S11 to the carriage return contact point 6 and from thence to the carriage return contact point 4 with which point 6 is now closed, and to the line feed relay coil K15, and from thence to the minus side of the D. C. line. This circuit results in the energization of the line feed relay K15 and the transfer of its A1 contact. When the carriage return contacts return to normal at the end of the carriage return operation, the carriage return contact 6 is closed with the carriage return contact 8, and the contact between the carriage return contacts 4 and 6 is broken. Therefore, the circuit to the line feed relay K15 is broken. Due to the slow drop-out characteristic of the line feed relay K15, its contact A1 will remain transferred long enough to complete the following circuit: from the positive D. C. through the typewriter switch S11, the carriage return contact 6 which is now in contact with the carriage return contact 8, from the carriage return contact 8 and to the transferred A1 contact of the line feed relay K15 and back to plug hub 26, thence to bottle-plugged hub 27 to cable terminal D2 and selector magnet L3, and from thence to the minus side of the line. The selector magnet L3 is energized with the result that a 2 code is punched into the tape. It may be noted that the carriage return code 4 is perforated in the tape when carriage return contacts 1, 3 and 5 are shorted together, and the punch will then complete one cycle before the line feed code 2 is perforated as described above.

While the fundamentally novel features of the invention have been illustrated and described in connection with specific embodiments of the invention, it is believed that these embodiments will enable others skilled in the art to apply the principles of the invention in forms departing from the exemplary embodiments herein, and such departures are contemplated by the claims.

What is claimed is:

1. In a typewriter and typewriter controlled tape punch combination, punch mechanism adapted to punch a line spacing code into a tape, a control magnet for said mechanism in said tape punch, a control circuit for said magnet, a carriage return mechanism in said typewriter, a pair of normally open electrical contacts in said control circuit and associated with said carriage return mechanism, means in said carriage return mechanism for closing said contacts upon operation of said carriage return mechanism, a source of electric current, and means operative when said carriage return mechanism has completed a carriage return operation for connecting said source of electric current to said control circuit.

2. In a typewriter and typewriter controlled tape punch combination, punch mechanism adapted to punch a line spacing code into a tape, a control magnet for said mechanism in said tape punch, a control circuit for said magnet, a carriage return mechanism in said typewriter, a pair of normally open electrical contacts in said control circuit and associated with said carriage return mechanism, means in said carriage return mechanism for closing said contacts upon operation of said carriage return mechanism, a source of electric current, means operative when said carriage return mechanism has completed a carriage return operation for connecting said source of electric current to said control circuit, and manual means for interrupting said control circuit whereby said magnet may be isolated from said source of electric current.

3. In a typewriter and typewriter controlled tape punch combination, punch mechanism adapted to punch a line spacing code into a tape, a control magnet for said mechanism in said tape punch, a control circuit for said magnet, a carriage return mechanism in said typewriter, a pair of normally open electrical contacts in said control circuit and associated with said carriage return mechanism, means in said carriage return mechanism for closing said contacts upon operation of said carriage return mechanism, a source of electric current, a second pair of normally open electrical contacts connecting said control circuit with said electric current, and means operative when said carriage return mechanism has completed a carriage return operation for closing said second pair of contacts to connect said control circuit with said source of electric current.

4. In a typewriter and typewriter controlled tape punch combination, punch mechanism adapted to punch a line spacing code into a tape, a control magnet for said mechanism in said tape punch, a control circuit for said magnet, a carriage return mechanism in said typewriter, a pair of normally open electrical contacts in said control circuit and associated with said carriage return mechanism, means in said carriage return mechanism for closing said contacts upon operation of said carriage return mechanism, a source of electric current, a second pair of normally open electrical contacts connecting said control circuit with said source of electric current, means operative when said carriage return mechanism has completed a carriage return operation for closing said second pair of contacts to connect said control circuit with said source of electric current, and manual means for interrupting said control circuit whereby said magnet may be isolated from said source of electric current.

5. In a typewriter and typewriter controlled tape punch combination, punch mechanism adapted to punch a line spacing code into a tape, a control magnet for said mechanism in said tape punch, a normally open control circuit for said magnet, a carriage return mechanism in said typewriter, a pair of normally open electrical contacts in said control circuit and associated with said carriage return mechanism, means in said carriage return mechanism for closing said contacts upon operation of said carriage return mechanism, means responsive to the closing of said contacts for closing said normally open control circuit, a source of electric current, and means operative when said carriage return mechanism has completed a carriage return operation for connecting said source of electric current to said control circuit.

6. In a typewriter and typewriter controlled tape punch combination, punch mechanism adapted to punch a line spacing code into a tape, a control magnet for said mechanism in said tape punch, a normally open control circuit for said magnet, a carriage return mechanism in said typewriter, a pair of normally open electrical contacts in said control circuit and associated with said carriage return mechanism, means in said carriage return mechanism for closing said contacts upon operation of said carriage return mechanism, means responsive to the closing of said contacts for closing said normally open control circuit, a source of electric current, means operative when said carriage return mechanism has completed a carriage return operation for connecting said source of electric current to said control circuit, and manual means for interrupting said control circuit whereby said magnet may be isolated from said source of electric current.

7. In a typewriter and typewriter controlled tape punch combination, punch mechanism adapted to punch a line spacing code into a tape, a control magnet for said mechanism in said tape punch, a normally open control circuit for said magnet, a carriage return mechanism in said typewriter, a pair of normally open electrical contacts in said control circuit and associated with said carriage return mechanism, means in said carriage mechanism for closing said contacts upon operation of said carriage return mechanism, a relay responsive to the closing of said contacts for closing said normally open control circuit, a source of electric current, and means operative when said carriage return mechanism has completed a carriage return operation for connecting said source of electric current to said control circuit.

8. In a typewriter and typewriter controlled tape punch combination, punch mechanism adapted to punch a line spacing code into a tape, a control magnet for said mechanism in said tape punch, a normally open control circuit for said magnet, a carriage return mechanism in said typewriter, a pair of normally open electrical contacts in said control circuit and associated with said carriage return mechanism, means in said carriage return mechanism for closing said contacts upon operation of said carriage return mechanism, a relay responsive to sive to the closing of said contacts for closing said normally open control circuit, a source of electric current, means operative when said carriage return mechanism has completed a carriage return operation for connecting said source of electric current to said control circuit, and manual means for interrupting said control circuit whereby said magnet may be isolated from said source of electric current.

9. In a typewriter and typewriter controlled tape punch combination, punch mechanism adapted to punch a line spacing code into a tape, a control magnet for said mechanism in said tape punch, a normally open control circuit for said magnet, a carriage return mechanism in said typewriter, a pair of normally open electrical contacts in said control circuit and associated with said carriage return mechanism, means in said carriage return mechanism for closing said contacts upon operation of said carriage return mechanism, a relay responsive to the closing of said contacts for closing said normally open control circuit, a second pair of normally open electrical contacts connecting said control circuit with a source of electric current, and means operative when said carriage return mechanism has completed a carriage return operation for closing said second pair of contacts to connect said control circuit with a source of electric current.

10. In a typewriter and typewriter controlled tape punch combination, punch mechanism adapted to punch a line spacing code into a tape, a control magnet for said mechanism in said tape punch, a normally open control circuit for said magnet, a carriage return mechanism in said typewriter, a pair of normally open electrical contacts in said control circuit and associated with said carriage return mechanism, means in said carriage return mechanism for closing said contacts upon operation of said carriage return mechanism, a relay responsive to the closing of said contacts for closing said normally open control circuit, a second pair of normally open electrical contacts connecting said control circuit with a source of electric current, means operative when said carriage return mechanism has completed a carriage return operation for closing said second pair of contacts to connect said control circuit with a source of electric current, and manual means for interrupting said control circuit whereby said magnet may be isolated from said control circuit.

References Cited in the file of this patent

UNITED STATES PATENTS

| | | |
|---|---|---|
| 2,378,371 | Tholstrup | June 12, 1945 |
| 2,436,126 | Tholstrup | Feb. 17, 1948 |
| 2,439,497 | Tholstrup | Apr. 13, 1948 |
| 2,448,842 | Tholstrup | Sept. 7, 1948 |
| 2,477,011 | Skinner | July 26, 1949 |